United States Patent [19]

Hanneman et al.

[11] 3,898,389

[45] Aug. 5, 1975

[54] VOLTAGE AND/OR CURRENT-SENSITIVE LOOP EXTENDER

[75] Inventors: Thomas W. Hanneman, Fountain Valley; Frederic R. Sparrevohn, Long Beach, both of Calif.

[73] Assignee: Communication Mfg. Co., Long Beach, Calif.

[22] Filed: May 3, 1974

[21] Appl. No.: 466,804

Related U.S. Application Data

[63] Continuation of Ser. No. 298,558, Oct. 18, 1972, abandoned.

[52] U.S. Cl. .............................................. 179/16 F

[51] Int. Cl. .............................................. H04q 1/30

[58] Field of Search ............. 179/16 E, 16 EA, 16 F

[56] References Cited

UNITED STATES PATENTS

| | | | |
|---|---|---|---|
| 3,757,052 | 9/1973 | Tothill | 179/16 F |
| 3,763,319 | 10/1973 | Chambers, Jr. | 179/16 F |
| 3,763,320 | 10/1973 | Chambers, Jr. | 179/16 F |
| 3,781,480 | 12/1973 | Roge | 179/16 F |
| R27,680 | 6/1973 | McNair, Jr. | 179/16 F |

*Primary Examiner*—Kathleen H. Claffy
*Assistant Examiner*—Randall P. Myers
*Attorney, Agent, or Firm*—Christie, Parker & Hale

[57] ABSTRACT

A telephone loop extending circuit for aiding central office battery. There are first and second pairs of input/output terminals and first and second voltage insertion circuits corresponding to the first and second pairs of terminals. Each insertion circuit has a path for current flow coupled between the corresponding pair of terminals. Each insertion circuit has a voltage source, a controllable switch operative when enabled for switching the voltage source between terminals of the corresponding terminal pair in first and second directions of polarity and a sensing circuit for sensing an applied current flow through the corresponding path in first and second directions and responsive to such sensing for enabling the controllable switches to switch the voltage source, respectively, in the first direction or in the second direction of polarity. Additionally included is a circuit operative in response to a rapid reversal in polarity of an applied voltage between two terminals, one from each of the terminal pairs, while the voltage source is coupled in one direction of polarity for enabling the controllable switch in either of the insertion circuits to reverse the polarity in which the corresponding voltage source is coupled in between terminals of the corresponding terminal pair.

16 Claims, 2 Drawing Figures

PATENTED AUG 5 1975

3,898,389

SHEET 2

VOLTAGE AND/OR CURRENT-SENSITIVE LOOP EXTENDER

CROSS-REFERENCE TO RELATED APPLICATIONS

This application is a continuation of the earlier filed patent application U.S. Ser. No. 298,558 filed Oct. 18, 1972, now abandoned, in the name of the same inventors as the present application.

BACKGROUND OF THE INVENTION

This invention relates to the transmission of telephone signals and, more particularly, to an improved loop extender for increasing battery voltage in the subscriber loop.

In telephone systems, a two-wire loop is provided between a central office and a subscriber's telephone set. A direct current voltage is applied between the lines at the central office. This direct current voltage is referred to as the central office battery. When a subscriber's telephone set goes off hook, a switch in the subscriber's telephone is closed, allowing current to flow around the loop. The current flowing around the loop is quite important as its presence causes various control functions as it is sensed such as line finding and maintaining a connection to the subscriber's line which is off hook.

However, as a subscriber's loop becomes longer, the resistance in the loop increases and finally reaches a point where the current flowing in the line cannot be reliably sensed by the central office equipment and therefore malfunctions occur in the dial equipment, line finding equipment and circuit for maintaining a subscriber loop hook-up.

Various means have been used to eliminate the aforementioned problem. One approach is to provide voltage insertion circuits, one on each side of the loop. Each voltage insertion circuit when switched on applies a booster voltage on the corresponding side of the loop in a direction which aids the central office battery. However, such prior art voltage insertion circuits suffer from a number of disadvantages.

One type of prior art voltage insertion circuit responds to voltage across the subscriber loop for switching booster voltage into each side of the loop. This type of circuit suffers from the serious disadvantage that it must always be positioned near the central office. If, for example, the voltage sensitive voltage type insertion circuit is positioned down line along a long subscriber loop, voltage across the two sides of the loop may decrease to the point where the voltage across the loop cannot be sensed. In this case, the voltage sensitive voltage insertion circuit will not reliably operate.

An alternative type of voltage insertion circuit is current sensitive. In other words, the circuit will detect a predetermined level of current flowing around the loop and responsive to the predetermined level of current, will switch on, thereby inserting booster voltage into each side of the loop. However, such a circuit suffers from the serious disadvantage that the total insertion voltage (sum of the insertion voltage applied at each side of the loop) cannot be equal to or exceed the central office battery voltage. This restriction is imposed because the polarity of the central office battery reverses when a subscriber goes off hook. If, under these conditions, the current sensitive type insertion circuit has a total circuit voltage equal to or greater than the central office battery voltage, the circuit will latch up and will not reliably reverse the polarity of the insertion voltage in the loop. As a result, two equal and opposite voltages occur around the loop and hence no current flows and the sensing circuitry at the central office will malfunction.

SUMMARY OF THE INVENTION

Briefly, an embodiment of the present invention is a telephone loop extending circuit for aiding central office battery. First and second pairs of input/output terminals are provided and first and second voltage insertion circuits are provided corresponding to the first and second pairs of terminals. Each insertion circuit has a path for current flow coupled between the corresponding pair of terminals and comprises a voltage source, controllable switch means operative when enabled for switching the voltage source means between terminals of the corresponding terminal pair in first and second directions of polarity and means for sensing an applied current flow through the corresponding path in first and second directions and responsive to such sensing for enabling the controllable switch means to switch the voltage means, respectively, in the first direction or in the second direction of polarity. Also included is means operative in response to a rapid reversal in polarity of an applied voltage between two terminals, one from each of the terminal pairs, while voltage source means is coupled in one direction of polarity for enabling the controllable switch means in each of the insertion circuits to reverse the polarity in which the corresponding voltage source means is coupled in between terminals of the corresponding terminal pair.

In a specific embodiment of the present invention, the telephone loop extending circuit comprises first and second pairs of input/output terminals. Additionally, first and second voltage insertion circuits are provided, one corresponding to each of the first and second pairs of terminals. Each insertion circuit has first and second voltage source means, first and second transistors, each having a base electrode and emitter-collector electrode circuit with the emitter-collector electrode circuit of the first transistor having one side coupled to a first side of the first voltage source means and the emitter-collector electrode circuit of the second transistor having one side coupled to a first side of the second voltage source means. Also in each insertion circuit is first and second light responsive means for controlling current conduction through the emitter-collector electrode circuit of, respectively, the first and second transistors. Also included in each insertion circuit is means for coupling the other side of the emitter-collector electrode circuits of the first and second transistors to a first terminal of the corresponding pair. The means for coupling also couples a second side of each of the first and second voltage source means to the second terminal of the corresponding terminal pair. The coupling means comprises first and second light generating means for sensing current flow between terminals of the corresponding terminal pair. The first light generating means is responsive to current flow between the corresponding terminals in a first direction for applying light to the first light responsive means, thereby causing the first transistor to couple the first voltage source means between terminals in a first direction of polarity. The second light generating means is responsive to current flow between terminals in a second direction for applying light to the second light responsive means, causing the second transistor to couple the second voltage source means between terminals in a second direction of polarity. In a preferred embodiment of the specific embodiment, a resistive impedance means is coupled from the base electrodes of both of the transistors in the first insertion circuit to the base electrodes of both of the transistors in the second insertion circuit.

Due to the presence of both voltage and current sensing, the loop extender can be placed at the central office or out to just past the mid-resistance point of the subscriber loop. Additionally, the voltage inserted by the loop extender can be of any value, including that equal to the central office battery voltage.

Additionally, the embodiment and specific preferred embodiment of the present invention are simplified over the above mentioned voltage and current sensitive voltage insertion circuits requiring substantially fewer components.

DESCRIPTION OF THE PREFERRED EMBODIMENT

Figure 1:
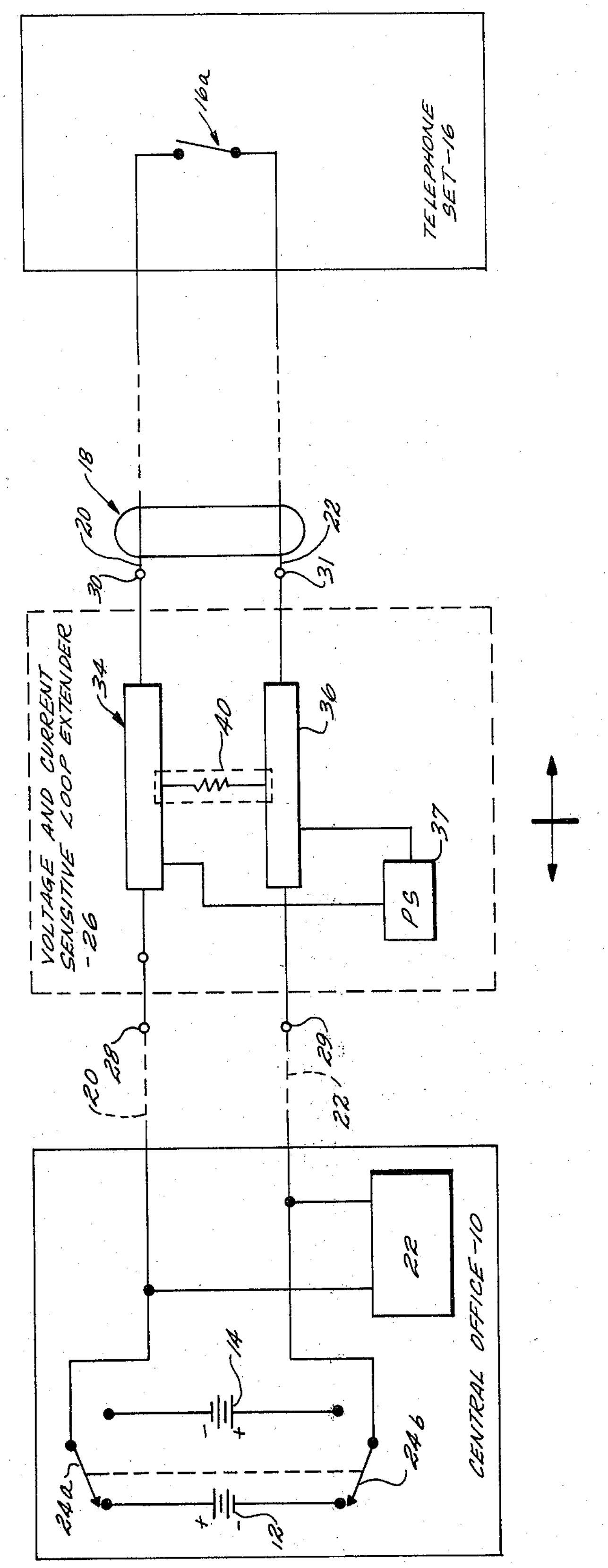
FIG. 1 shows a schematic and block diagram containing a voltage and current sensitive loop extender and embodying the present invention.

Refer now to the schematic and block diagram of a telephone system shown in FIG. 1. Included is a central office 10 having positive and negative batteries 12 and 14. It will be recognized that the batteries 12 and 14 may be various types of sources of direct current potential but are referred to herein for simplicity as batteries. A telephone 16 with the on-off hook switch 16*a* is coupled to the central office 10. Telephone lines 20 and 22 are used to interconnect the central office 10 and telephone set 16. The overall loop including the path through the central office battery and the on-off-hook 16*a* in the telephone set 16 is referred to as telephone loop 18.

Significant to the present invention, a voltage and current sensitive loop extender 26 is connected in series in the loop 18. To be explained in more details and as indicated by the arrows underneath the voltage and current sensitive loop extender 26, the fact that the loop extender is both voltage and current sensitive allows the loop extender to be positioned at any point along the loop 18 in between the central office and just past mid-resistance point to the telephone set 16.

Figure 2:
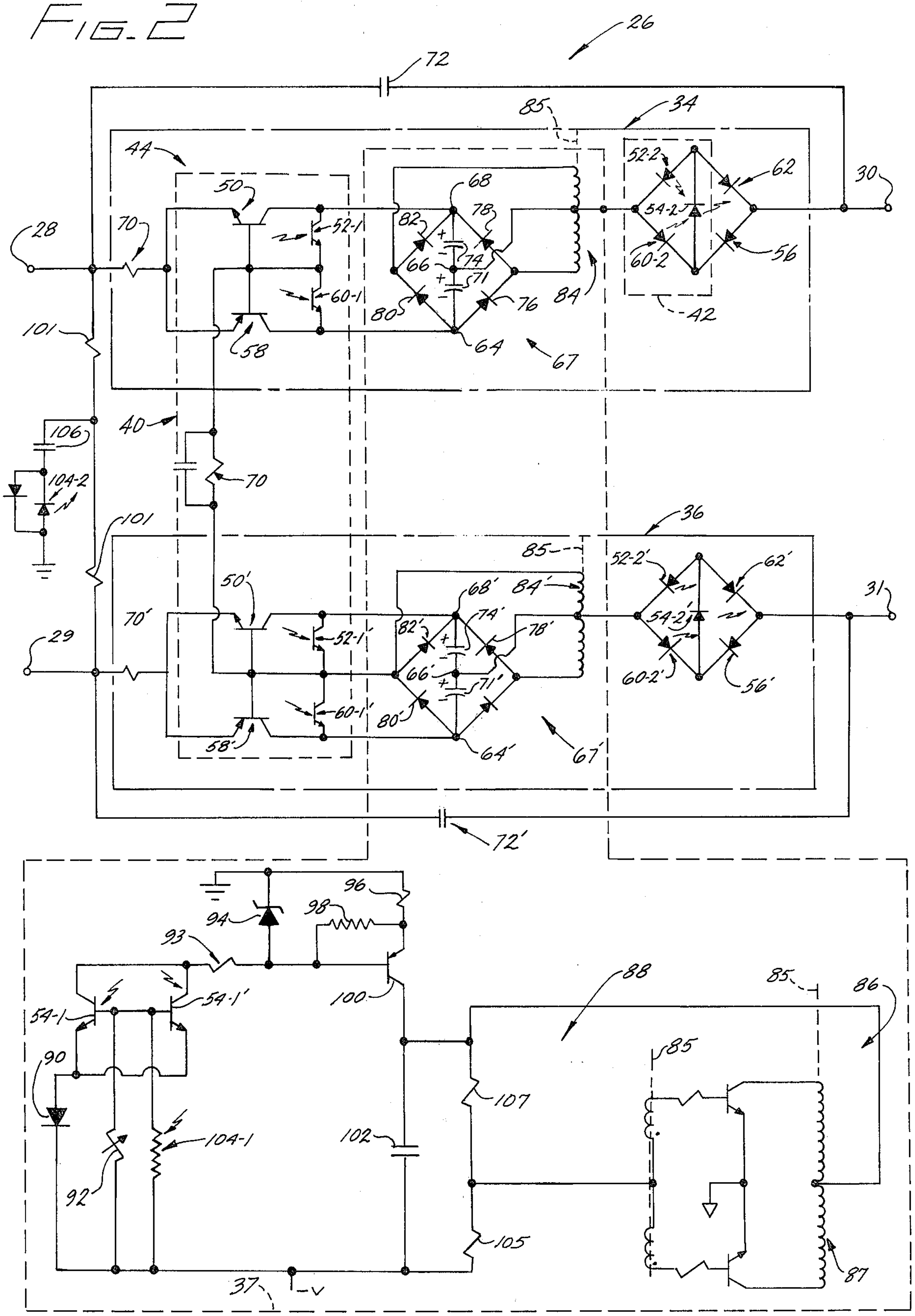
FIG. 2 is a schematic diagram showing the details of the voltage and current sensitive loop extender for use in the schematic and block diagram of FIG. 1 and embodies the present invention.

Referring now to FIGS. 1 and 2, the telephone loop extending circuit 26 includes voltage booster circuits or switching circuits 34 and 36 connected in series with the upper line 20 of the loop 18 and in series with the lower line 22, respectively.

The functions of the various circuit elements shown in FIG. 2 overlap to some extent. However, the loop extender 26 can be divided up into distinct functional parts.

The circuits 34 and 36 each have a path therethrough which is connectable into the current loop, each for passing current in either of two directions in the loop. Circuit 34 its current path is connected in series in the upper line 20 of the loop between a pair of input/output terminals 28 and 30 whereas the circuit 36, and its current path, is connected in series in the lower line 22 between a pair of input/output terminals 29 and 31. A voltage source or power supply 37 (indicated by dash lines in FIG. 2), is provided for supplying the necessary insertion voltage. A voltage sensing circuit or means 40 is coupled between the two circuit paths and senses the voltage applied between the two circuits 34 and 36 by the central office 10.

The upper circuit 34 is identical to the lower circuit 36 and therefore, for simplicity, the following discussion will be directed only to the components of the upper circuit path unless otherwise specified. The circuits in the lower circuit path are identified by the same reference numerals as those in the upper circuit path but with a prime affixed to distinguish between the two circuits.

Within the circuit 34 is a current sensing circuit or means 42. The current sensing circuit 42, including light emitting diode 52-2 and 60-2, senses current flowing in the current path of circuit 34 and enables means 44 to switch the insertion voltage between the corresponding input/output terminals 28 and 30 in either of two directions of polarity. The means 44 of each of circuits 34 and 36 switches the voltage source so that the insertion voltages are in the same direction of polarity around the loop 18.

The power supply 37 includes a voltage source circuit for each of the circuits 34 and 36. Considering the circuit 34, the voltage circuit source 67 is shown having terminals 64, 66 and 68. To be explained in more detail, generally the central office battery is ±48 volts in magnitude. Typically, half of that same voltage is applied between terminals 64 and 66 and half is applied between terminals 66 and 68 with the indicated polarity, giving a total voltage between terminals 64 and 68 equal to that of the central office battery. However, it should be understood that the potential between terminals 64 and 68 need not be equal to the central office battery but could be higher or lower as desired. In any event, the potential between terminal 64 and 66 will always be half of that between terminals 64 and 68.

Transistor 50 forms a controllable switching means enabled by photocoupler 52 for coupling the insertion voltage formed between terminals 68 and 66 between terminals 28 and 30, respectively. It will be seen that such a condition causes a positive potential to be applied on terminal 28 with respect to terminal 30. Transistor 58 forms a controllable switching means enabled by the photocoupler 60 for coupling the voltage applied between terminals 66 and 64 between terminals 28 and 30, respectively. Such a condition causes a negative voltage on terminal 28 with respect to terminal 30. The voltage sensing means 40 includes a very high impedance resistor 170 and the transistors 50, 58, 50′ and 58′, which form a part of circuits 34 and 36.

Capacitors 72 and 72′ are connected between the terminals 28 and 30 and 29 and 31, respectively, to provide a low impedance bypass for transient and voice frequency telephone signals along the loop 18.

Consider now the operation of the voltage and current sensitive loop extender in circuit 26 shown in FIGS. 1 and 2. Initially, assume that the central office 10 has the switch 24*a* and 24*b* in the condition as indicated in FIG. 1 applying a positive battery voltage on the upper line 20 with respect to the lower line 22. Also assume that the telephone set 16 is on-hook with the switch 16*a* open. Under these conditions, the circuit is inactive and no action takes place.

Assume that the switch contacts 24*a* and 24*b* are still as indicated in FIG. 1 but that the subscriber goes off-hook and the switch 16*a* closes. Under these conditions, a very low amount of leakage current initially flows from left to right along the upper line 20 of the loop and from right to left along the lower line 22 of the loop through the circuit paths 34 and 36. Although the leakage current is very low, it is enough to energize light emitting diode 60-2 of optical coupler 60 which, in turn, optically energizes the photosensitive transistor 60-1, causing it to be switched into a saturated conductive condition in between its emitter-collector electrodes or input/output circuit. Conduction of photosensitive transistor 60-1 pulls the potential of the base of transistor 58 down approximately to the potential on its collector, causing transistor 58 to be switched into a conductive condition. As a result, the negative voltage at terminal 64 is coupled through a resistor 70 to the terminal 28 by transistor 58 and the positive negative to positive voltage between terminal 66 is coupled through the light emitting diode 60-2, light emitting diode 54-2 and the diode 62 to the terminal 30. As a result, the voltage at terminals 64 and 66 is coupled to the terminals 28 and 30, respectively.

The resistance of series limiting resistor 70 is of very small magnitude, therefore the voltage between terminals 28 and 30 is approximately equal to that across terminals 64 and 66.

The same analysis of the circuit path 36 reveals that the photosensitive diode 52-2′ will energize the photosensitive transistor 52-1′, pulling the potential on the base of transistor 50′ up approximately to that at its collector, switching the transistor 50′ into a conductive condition, thereby coupling terminals 68′ and 66′ to terminals 29 and 31, respectively, thereby applying a positive voltage on the terminal 29 with respect to the terminal 31.

Assume now that the switches 24*a* and 24*b* in central office 10 are switched across the terminals of battery 14. A negative voltage is now applied at terminal 28 with respect to terminal 29 and current flows from right to left in the upper line 20 and right to left in the lower line 31. Under these conditions, the light emitting diode 52-2 of photocoupler 52 will optically energize photosensitive transistor 52-1, switching it into conduction, pulling the potential on the base of transistor 50 up approximately to its collector, causing transistor 50 to be switched into a conductive condition. As a result, the positive voltage at terminal 68 will be coupled to terminal 28 and the negative voltage at terminal 66 will be coupled through photosensitive diodes 52-2, 54-2 and diode 56 to the terminal 30, thereby applying a positive potential on the terminal 28 with respect to the terminal 30. A similar analysis will reveal that in the lower circuit path 36, light emitting diode 60-2′ of photocoupler 60 optically energizes transistor 60-1′ causing transistor 58′ to be switched into a conductive condition. As a result, terminal 64′ is coupled to terminal 29 and terminal 66′ is coupled to terminal 31, thereby applying a negative voltage on terminal 29 with respect to 31.

It should be immediately recognized from the foregoing description that in a condition where, for example, the terminal 30 side of the line 20 is grounded at the telephone subscriber end of the line and either a positive or negative potential is applied on the terminal 28 end of the line by the central office station, the circuit will work in the same manner as that described above except that the lower circuit 36 will not be switched into operation. The same comments are true relative to the lower circuit 36. This is important in specialized telephone applications.

Although it is not essential to the present invention, the power supply 37 is a switchable type power supply wherein the power supply is switched into an off condition when neither of the circuit paths 34 and 36 is conducting. In other words, when circuit paths 34 and 36 are not conducting, the power supply 37 is in an off condition.

Assume that the switches 24*a* and 24*b* are as shown in FIG. 1 and a steady state condition exists as described above where a negative potential exits on terminal 28 with respect to 30. Under these conditions, transistors 58 and 50′ are on and capacitor 72 is charged positive on terminal 30 with respect to 28.

Also assume now that, as in telephone applications, the central office battery voltage suddenly reverses. This is equivalent to switching the switches 24*a* and 24*b* across battery 14.

Under these conditions, the importance of the voltage sensitive circuit 40 is illustrated. If the insertion voltage between terminals 28 and 30 (or 29 and 31) is exactly half of that of the central office battery, the sum of the voltages around the loop between 28 and 30 and 31 and 29 is equal to that of the central office battery.

Under these conditions, when the sudden reversal in voltage polarity occurs the applied voltage between terminals 28 and 29 reverses and the voltage around the loop is zero, stopping all current from flowing around the loop. Therefore, the current sensing circuits will not cause any change in polarity of the booster voltage in circuit paths 34 and 36. However, due to the negative to positive voltage coupled between terminals 28 and 29, current flows through the emitter to base electrodes of transistor 58′ through the high impedance resistor 170 and through the base to emitter electrodes of transistor 50 thereby switching transistors 50 and 58′ into a conductive condition and switching transistors 50′ and 58 off. As a result, terminals 68 and 66 are switched between terminals 28 and 30, respectively, and terminals 66′ and 64′ are switched between terminals 31 and 29, respectively. This results in a voltage insertion voltage of the proper polarity. Thus the resistor 170 in conjunction with the transistors 50, 58, 50′ and 58′ form means operative in response to reversals in polarity of applied voltage between terminals 28 and 29 for disabling or switching off the transistor which is in conduction and causing the other transistor to switch on.

Consider now the details of the power supply 37. The circuit 67 and 67′ portion located in the circuit paths 34 and 36 are in the form of full wave rectifiers. Referring to voltage circuit 67, capacitors 71 and 74 are connected between terminals 64 and 66 and 68, respectively; diodes 76 and 78 are serially connected together in series between terminals 64 and 68, and similarly, diodes 80 and 82 are serially connected between terminals 64 and 68. The junction between the diodes 76 and 78 and the junction between diodes 80 and 82 are connected across the terminals of a secondary winding 84 of a transformer 86. The junction of the capacitors 71 and 74 (terminal 66) are connected to the center tap on the secondary winding 84 and to the junction of light emitting diodes 52-2 and 60-2. The transformer 86 forms a part of a conventional free running, self-saturating oscillator 88, the details of which are well known in the oscillator art and need not be explained herein for a full understanding of the invention.

However, the control for the oscillator circuit should be noted. The light emitting diodes 54-2 and 54-2' are part of photo-optical couplers 54 and 54' which, similar to 50, 58, 50' and 58', include the photosensitive transistors 54-1 and 54-1'. The photosensitive transistors have their collectors connected together and their emitters connected together, the emitter circuits being connected through a diode 90 to a negative potential —V which is typically equal to the battery voltage at the central office 10. The base electrodes of the photosensitive transistors 54-1 and 54-1' are connected together through a variable resistor 92 to the —V potential. Adjustment of the variable resistor allows the amount of current passing through light emitting diodes 54-2 and 54-2' at which the transistors 54-1 and 54-1' are energized to be adjusted to the desired level.

The base electrode of a PNP type transistor 100 is connected through a current limiting resistor 93 to the collector electrodes of the photosensitive transistors 54-1 and 54-1'. When either one of the photosensitive transistors 54-1 and 54-1' is switched into a conductive condition, current is drawn through the base of transistor 100, causing it to be switched into a conductive condition. When transistor 100 is switched into a conductive condition, a capacitor-resistor filter circuit, comprised of resistor 105 and 107 and capacitor 102, is coupled between —V potential and ground through the resistor 96 supplying power to the free running, self-oscillating circuit 88 causing it to supply alternating current signals in the primary winding 87 and hence in the secondary windings 84 and 84' to thereby provide alternating current signals in the full wave rectifier circuit 67 and 67'; the numeral 85 designates the common core of the transformer 86 about which all of its windings are wound.

When both transistors 54-1 and 54-1' are switched into a non-conductive condition (which occurs when no current flows in the loop 18), transistor 100 is switched into a non-conductive condition, disconnecting the capacitor 102 from ground potential, thereby causing the free running oscillator circuit 88 to stop oscillating. As a result, virtually no power is consumed by the loop extending circuit 26 when the subscriber's telephone set is on-hook and the loop is open.

It is also important to note that a zener diode is connected between the base of transistor 100 and ground, thereby providing a fixed bias on the base of the transistor 100. As current increases in the circuit paths 34 and 36, current drawn from the free running oscillator increases, thereby causing more current to flow through the transistor 100. As current through transistor 100 increases, the voltage across resistor 96 increases causing the voltage on the collector of the transistor 100 to drop thereby decreasing the voltage output from the free running oscillator 88. As a result, the output voltage is dropped, maintaining a more constant flow of current around the loop.

The central office 10 signals a ringing action in the loop by applying a very large A.C. signal between the upper terminal 28 and the lower terminal 29 with one or the other grounded. It is desirable to prevent the loop extender 26 from switching into an active condition in response to the large A.C. ringing signal in order to avoid boosting the AC signal. Accordingly, a pair of resistors 101 and 101' are connected in series between the terminals 28 and 29 and, at the junction of the resistors 101, and 101' capacitor 106 and light emitting diode 104-2 of a photocoupler 104 are connected to ground. A photosensitive resistor 104-1 of photocoupler 104 is optically coupled to the light emitting diode 104-2 and is also connected between the base electrodes of transistors 52-1 and 52-1' and the —V potential. With this arrangement, a large AC signal between terminal 28 and terminal 29 with either terminal grounded causes the light emitting diode 104-2 to be photo-optically energized, thereby energizing the photosensitive resistor 104-1. The photo-optically energized resistor 104-1 switches into a very low conductive condition which essentially pulls the potential on the base electrodes of the transistors to the —V potential, preventing either transistor from switching into a conductive condition. Therefore, the power supply is prevented from switching on and as a result, no insertion voltage is applied into the loop during the ringing action.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

What is claimed is:

1. A telephone loop extending circuit for aiding central office battery comprising:

a. first and second pairs of input/output terminals for connection in opposite sides of a telephone loop;

b. first and second voltage insertion circuits corresponding to said first and second pairs of terminals, each insertion circuit having a path for current flow coupled between the corresponding pair of terminals and comprises:

1. voltage source means,
2. controllable switch means operative when enabled for switching the voltage source means between terminals of the corresponding terminal pair in first and second directions of polarity, and
3. means for sensing an applied current flow through the corresponding path in first and second directions and responsive to such sensing for enabling the controllable switch means to switch the voltage means, respectively, in the first direction or in the second direction of polarity; and c. means for sensing an applied voltage between a terminal of the first pair of terminals and a terminal of the second pair of terminals and operative in response to a rapid reversal in polarity of an applied voltage while voltage source means is coupled in one direction of polarity for enabling the controllable switch means in each of the insertion circuits to reverse the polarity in which the corresponding voltage source means is coupled in between terminals of the corresponding terminal pair.

2. A telephone loop extending circuit according to claim 1 wherein said means for sensing an applied current flow comprises means for generating light responsive to the current flow and wherein said controllable switch means comprises a light responsive control means which is responsive to light from the light generating means.

3. A telephone loop extending circuit according to claim 1 wherein the controllable switch means comprises first and second transistors, each having base, emitter and collector electrodes, the emitter-collector electrode circuit of each of the first and second transistors being coupled between the voltage source means and one of the terminals of the corresponding terminal pair, and wherein the means for sensing an applied voltage comprises impedance means coupled between the base electrode of both of the first and second transistors in the first circuit and the base electrodes of both of the transistors in the second circuit.

4. A telephone loop extending circuit according to claim 3 wherein said means for sensing an applied current flow comprises light generating means for sensing current flow in opposite directions in the corresponding current path, and wherein said controllable switch means comprises first and second light responsive control means, the first and second light responsive control means responding to light from the first and second light generating means for applying control signals from the emitter-collector electrode circuit to the base electrode of, respectively, said first and second transistors, thereby switching the respective transistors into conduction.

5. A telephone loop extending circuit for aiding central office battery comprising:

a. first and second pairs of input/output terminals for connection on opposite sides of a telephone loop;
b. first and second voltage insertion circuits corresponding to said first and second pairs of terminals, each insertion circuit having a path for current flow coupled between the corresponding pair of terminals, each insertion circuit comprising:
    1. first and second voltage source means,
    2. first controllable switch means operative when enabled for switching the first voltage source means between the corresponding terminal pair in a first direction of polarity,
    3. second controllable switch means operative when enabled for switching the second voltage source means between the corresponding terminal pair in a second direction of polarity,
    4. first means for sensing an applied current flow through the corresponding path in a first direction and, responsive thereto, enabling the first controllable switch means to switch the first voltage source means,
    5. second means for sensing an applied current flow through the corresponding circuit path in a second direction and, responsive thereto, enabling the second controllable switch means to switch the second voltage source means; and
c. third means for sensing an applied voltage between a terminal of the first pair of terminals and a terminal of the second pair of terminals and operative in response to a rapid reversal in polarity of an applied voltage while controllable switch means are enabled for disabling the controllable switch means then enabled and for causing the other controllable switch means in each of the insertion circuits to be enabled.

6. A telephone loop extending circuit according to claim 5 wherein said first and second means for sensing current comprises, respectively, first and second light generating means, and wherein said first and second controllable switch means each comprise light responsive means for responding to light from, respectively, the first and second light generating means.

7. A telephone loop extending circuit according to claim 6 wherein the light generating means of the first and second means for sensing current comprises unilateral current conductive means; and additionally comprising means for coupling the unilaterally conductive means of each insertion circuits together so that current flows through each in opposite directions in the corresponding current path.

8. A telephone loop extending circuit according to claim 6 wherein said first and second controllable switch means each further comprises switch means controlled by the corresponding light responsive means for coupling the corresponding voltage source means between the terminals of the corresponding terminal pair.

9. A telephone loop extending circuit according to claim 5 wherein each controllable switch means comprises a transistor having base, emitter and collector electrodes, the emitter-collector electrode circuits of the transistors in the first and second controllable circuits being coupled from, respectively, the first and second voltage source means to a terminal of the corresponding terminal pair, and wherein the third means comprises impedance means coupled from the base electrodes of the transistors in the first voltage insertion circuit to the base electrode of the transistors in the second voltage insertion circuit.

10. A telephone loop extending circuit for aiding central office battery comprising:

a. first and second pairs of input/output terminals for connection in opposite sides of a telephone loop;
b. first and second voltage insertion circuits corresponding to said first and second pairs of terminals, each insertion circuit having a path for current flow coupled between the corresponding pair of terminals, each insertion circuit comprising:
    1. voltage source means,
    2. first controllable switch means operative when enabled for switching the voltage source means between the corresponding terminal pair in a first direction of polarity,
    3. second controllable switch means operative when enabled for switching the voltage source means between the corresponding terminal pair in a second direction of polarity,
    4. first means coupled in between terminals of the corresponding terminal pair for sensing an applied current flow in a first direction therebetween and responsive thereto, enabling the first controllable switch means to switch the voltage means in the first direction of polarity,
    5. second means coupled in between terminals of the corresponding terminal pair for sensing an applied current flow in a second direction therebetween and responsive thereto, enabling the second controllable switch means to switch the second voltage source in the second direction of polarity; and
c. third means for sensing an applied voltage between a terminal of the first pair of terminals and a terminal of the second pair of terminals and operative in response to a rapid reversal in polarity of an applied voltage while controllable switch means are enabled for disabling the controllable switch means then enabled and for causing the other controllable switch means in each of the booster circuits to be enabled.

11. A telephone loop extending circuit for aiding central office battery comprising:

a. first and second pairs of input/output terminals;

b. first and second voltage insertion circuits corresponding to said first and second pairs of terminals, each comprising:

1. first and second voltage source means,
2. first and second transistors, each having a base electrode and an emitter-collector electrode circuit, the emitter-collector electrode circuit of the first transistor having one side coupled to a first side of the first voltage source means, the emitter-collector electrode circuit of the second transistor having one side coupled to a first side of the second voltage source means,
3. first and second light responsive means for controlling current conduction through the emitter-collector electrode circuits of, respectively, the first and second transistors, and
4. first means for coupling the other side of the emitter-collector electrode circuits of the first and second transistors to a first terminal of the corresponding pair and second means for coupling a second side of each of the first and second voltage source means to the second terminal of the corresponding pair, one of the coupling means comprising first and second light generating means for sensing current flow between terminals of the corresponding terminal pair, the first light generating means being responsive to current flow between the corresponding terminals in a first direction for applying light to the first light responsive means, thereby causing the first transistor to couple the first voltage source means between terminals in a first direction of polarity, the second light generating means being responsive to current flow between terminals in a second direction for applying light to the second light responsive means, causing the second transistor to couple the second voltage source means between terminals in a second direction of polarity.

12. A telephone loop extending circuit according to claim 11 wherein said first and second light responsive means comprise, respectively, first and second unilateral current conductive means for connecting the unilateral conductive means so that current flowing in first and second directions between terminals of the corresponding terminal pair passes through, respectively, the first and second unilaterally conductive means.

13. A telephone loop extending circuit according to claim 11 wherein said first and second voltage source means comprise first and second serially connected capacitor means and a full wave bridge rectifier circuit for applying signals across the serially connected capacitor means, the second side of each of the voltage source means being at the common side of the capacitor means and the first side of the first and second voltage source means being at the other side, respectively, of the first and second capacitor means.

14. A telephone loop extending circuit according to claim 11 comprising resistive impedance means coupled from the base electrodes of both of the transistors in the first insertion circuit to the base electrodes of both of the transistors in the second insertion circuit.

15. A telephone loop extending circuit according to claim 11 wherein the first and second light responsive means each comprises an input/output circuit coupled from the base electrode to the emitter-collector electrode circuit of the corresponding transistor.

16. A telephone loop extending circuit according to claim 15 wherein the first and second light responsive means each comprises a photo-sensitive transistor element.

* * * * *

UNITED STATES PATENT AND TRADEMARK OFFICE

CERTIFICATE OF CORRECTION

PATENT NO. : 3,898,389

DATED : August 5, 1975

INVENTOR(S) : Thomas W. Hanneman, Frederic R. Sparrevohn

It is certified that error appears in the above-identified patent and that said Letters Patent are hereby corrected as shown below:

Column 4, line 30, "circuit source" should be -- source circuit --

Column 5, line 21, delete "negative"
line 22, delete "to positive", delete "between" and insert -- at --
line 25, after "the" insert -- negative to positive --
line 25, delete "at" and insert -- between -
line 25, delete "to" and insert -- between --

Column 6, line 21, after "in" insert -- certain --
line 29, 30, before "28" insert -- terminals --
before "31" insert -- terminals --

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*